April 9, 1935.  T. GLEN, JR  1,997,255
SIFTER
Filed Feb. 17, 1932

INVENTOR.
Thomas Glen (Jun')
By his Attorney.

Patented Apr. 9, 1935

1,997,255

UNITED STATES PATENT OFFICE 1,997,255

SIFTER

Thomas Glen, Jr., Coogee, Australia

Application February 17, 1932, Serial No. 593,462
In Australia April 23, 1931

2 Claims. (Cl. 209—374)

The invention relates to sifters particularly of the class adapted for culinary purposes, for instance the sifting of flour.

According hereto a sieving medium such as gauze or the like forms a false bottom for a cylindrical receptacle and is rotatable, to limited extent, by a projecting handle.

The sieving medium may be in form of a disc fixed upon or within a metal ring operable by a handle which may be fixed or adapted to slide into the receptacle to facilitate packing.

The accompanying drawing illustrates a practical embodiment of my invention but it will be understood that the scope of the invention is not limited to the precise details of construction illustrated.

Figure 1:
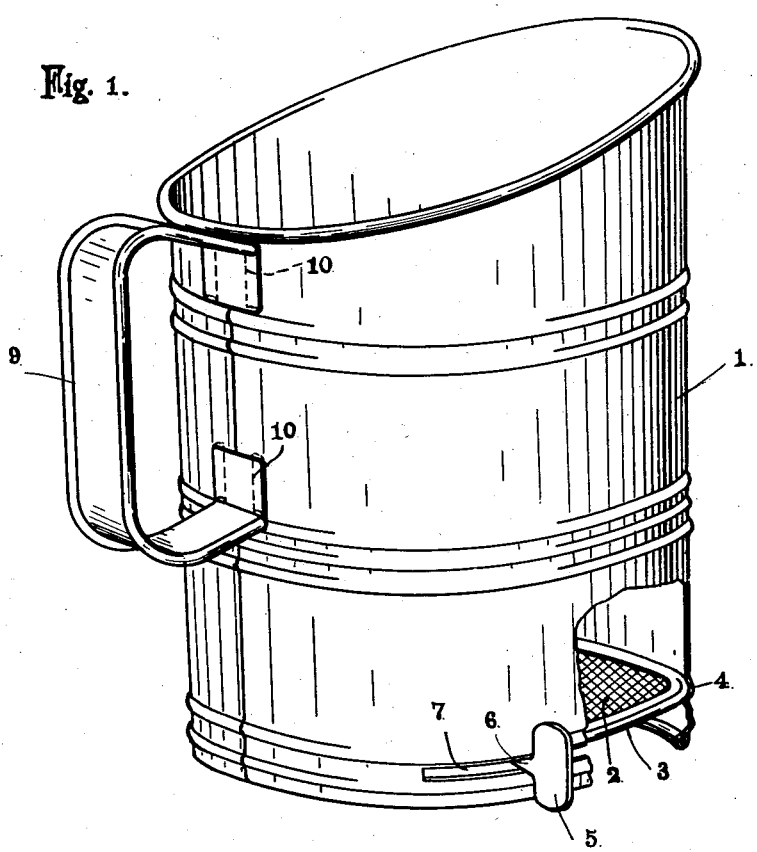
Figure 2:
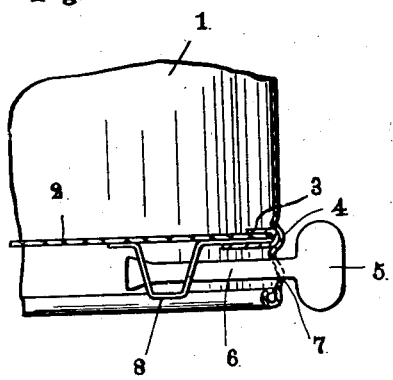

Fig. 1 is a perspective view, a part in section.
Fig. 2, a fractional sectional elevation and
Fig. 3, a fractional inverted plan.

A cylindrical receptacle 1 has a false bottom comprised of a disc 2 of sieving material clamped in a surrounding U shaped ring 3, which is partially rotatable in a groove formed in the inner circumference of the wall of the receptacle by an outwardly expressed bead 4.

To facilitate packing of a number of these sifters for transport, the receptacle is made slightly conical so that one may be nested into another, and for the same reason the handle for operating the false bottom is connected thereto in such manner that it may be slid into the receptacle.

The handle shown in the drawing is comprised of a head 5 upon the end of a stem 6 which works in a circumferential slot 7 in the receptacle, and is slidable radially through holes in a bracket 8 fixed to the ring 3 and also to the sieving material 2.

The innermost hole in bracket 8 is oblong and the end of stem 6 is sided in section and gradually tapered outwardly at its inner end whereby when the stem is drawn out by the head the tapered end of the stem closely fits the hole in the innermost member of the bracket and there then is no tendency for the handle to turn while the false bottom is being operated.

Figure 3:
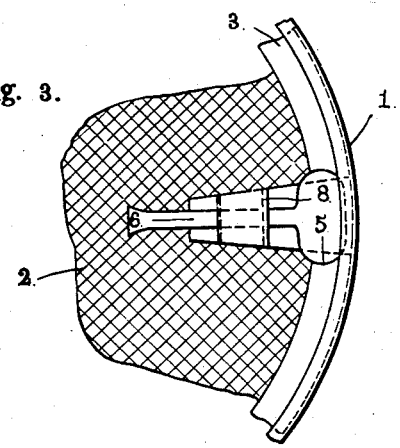

When out of use the stem may be pushed in until its end passes out of the innermost hole in the bracket, the handle may then be turned to enable head 5 to be passed through slot 7 into the receptacle as shown in Fig. 3.

A handle 9 for the receptacle is comprised of sheet metal beaded upon the side edges and bent into the shape shown in the drawing.

Tongues 10 projecting from the upper and lower ends of the handle are passed through corresponding holes in the receptacle and bent inwardly thereby firmly securing the handle to the receptacle.

I claim:—

1. A sifter comprised of a cylindrical receptacle having a groove in its inner circumference, a disc of sieving material rotatably mounted in the groove, a bracket connected to the disc, spaced portions of the bracket projecting downwardly and having radially aligned holes, the hole in the innermost portion being oblong, a handle comprised of a head and a stem, the inner end of the stem tapering to fit the oblong hole in the bracket member, the stem rotatable in the holes in the bracket members and slidable therethrough for the purpose of retracting the head through a slot in the receptacle.

2. In a sifter, a cylindrical receptacle having a groove in its inner circumference formed by an outwardly expressed bead, a false bottom comprised of a disc of sieving material in a surrounding U shaped ring, the ring being rotatably mounted in the groove, a U shaped bracket fixed to the false bottom the members thereof having radially aligned holes the innermost hole being oblong, a handle comprised of a stem and a head, the inner end of the stem tapering to fit the oblong hole in the bracket and the stem slidable through said holes in the bracket whereby the head is retractable through a slot in the receptacle.

THOMAS GLEN, Junior.